United States Patent
Takahashi

[19]
[11] Patent Number: 5,924,216
[45] Date of Patent: Jul. 20, 1999

[54] TWO-STAGE DRYING SPRAY DRYER

[75] Inventor: Masashi Takahashi, Yokohama, Japan

[73] Assignees: Powdering Japan, K.K.; Morinaga Milk Industry Co., Ltd., both of Tokyo, Japan

[21] Appl. No.: 08/841,653

[22] Filed: Apr. 30, 1997

[30] Foreign Application Priority Data

Jul. 11, 1996 [JP] Japan .................... 8-181836

[51] Int. Cl.$^6$ .............. F26B 3/08; B01B 1/00
[52] U.S. Cl. ............... 34/374; 34/60; 159/4.09
[58] Field of Search ............... 34/60, 69, 236, 34/372, 373, 374; 159/4.01, 4.09

[56] References Cited

U.S. PATENT DOCUMENTS

| | | | |
|---|---|---|---|
| 2,847,766 | 8/1958 | Silver | 159/4.09 |
| 3,011,543 | 12/1961 | McCormack, Jr. | 159/4.01 |
| 3,101,258 | 8/1963 | Johnson | 159/4.01 |
| 3,596,699 | 8/1971 | Okada et al. | 159/4.01 |
| 3,741,273 | 6/1973 | Meade | 159/4.01 |
| 4,012,846 | 3/1977 | Silva | 159/4.01 X |
| 4,198,264 | 4/1980 | Kaspar et al. | 159/4.01 |
| 4,352,718 | 10/1982 | Grun | 159/4.01 X |
| 4,784,878 | 11/1988 | Haak | 159/4.09 X |
| 4,896,436 | 1/1990 | Iwaya et al. | 34/60 |
| 5,096,537 | 3/1992 | Bergquist et al. | 159/4.01 |
| 5,209,821 | 5/1993 | Shaw et al. | 159/4.01 |
| 5,227,017 | 7/1993 | Tanaka et al. | 159/4.01 |
| 5,596,817 | 1/1997 | Hansen | 34/373 |
| 5,632,100 | 5/1997 | Hansen | 34/374 |
| 5,685,089 | 11/1997 | Getler et al. | 34/372 |

*Primary Examiner*—Christopher B. Kilner
*Attorney, Agent, or Firm*—Pillsbury Madison & Sutro LLP

[57] ABSTRACT

The spray dryer comprises a rectangular upper body(1), a middle body(2) having a pair of side walls inclining inward and approaching mutually along larger side walls of the upper body, a rectangular bottom body(3), a ceiling board (4), a bottom plate(5), a vertical partition wall(6) for separating the upper body into a larger chamber(7) and a smaller chamber(8), and a gas stream dispersing perforated plate(14) disposed in a middle portion of the bottom body. The larger chamber(7) works as a spray drying zone and the upper half portion(17) of the bottom body works as a fluidized drying zone. Raw material fluid and hot gas are introduced downward into the larger chamber, and sprayed smaller size fluid particles are dried completely in the spray drying zone to have a low density, and enter to the lower bottom part of the smaller chamber with exhausted hot gas and turn upward to be discharged from outlet(13) disposed in an upper portion of the smaller chamber. Sprayed larger size fluid particles which are not completely dried in the larger chamber fall down to the fluidized drying zone and completely dried to have a low density, and then discharged together with the smaller size particles.

7 Claims, 6 Drawing Sheets

TWO-STAGE DRYING SPRAY DRYER

BACKGROUND OF THE INVENTION

1. Field of the Invention

The present invention relates to a spray dryer for drying instantly a process fluid containing solid material dissolved as an aqueous solution or dispersed in water as a slurry by spraying under pressure the process fluid from spray nozzles into a hot gas stream, and it specifically relates to a spray dryer capable of processing a large amount of the fluid in spite of the drying chamber of a lowered height.

2. Description of the Prior Art

A tower type spray dryer can characteristically produce dried powder instantly by spraying a process fluid from an upper portion of the drying chamber into a hot gas stream so as the fluid is pulverized and dried under increased surface area per unit weight. Especially, in the so-called parallel-flow type operation where an inlet of hot gas is disposed around an inlet of process fluid (fluid to be dried) so as the pulverized fluid is entrained by the hot gas stream, the operation is characterized by that most of the water contained evaporates at an initial stage of drying occurring in the neighborhood of the inlet of hot gas and no remarkable temperature rise occurs for the pulverized fluid even when the drying gas stream is so hot as around 200° C. The drying tower must have a reasonable height as the drying should finish completely before the powder reaches bottom portion of the dryer. Nevertheless, due to the simple structure and easy operation, the drying apparatus (tower) is employed widely in food, pharmaceutical and chemical industries as the most simplified methods of processing a large amount of raw material sensible of heat or apt to be blackened.

For materials which are stable at high temperatures of above 400° C. like detergents, a counter-flow type drying operation where a hot gas stream is countered with a pulverized process fluid in a drying chamber is employed. However, since the operation does not utilize the original merits of spray dryer, the counter-flow type drying operation is employed only in limited fields.

Conventionally, most of the parallel-flow type spray dryer has at the center of head portion (ceiling portion) of the cylindrical vertical drying chamber a single inlet of hot gas for blowing a hot gas for drying downward into the drying chamber. For a spray dryer processing a relatively small amount (evaporating load of not larger than 2000 kg/hr), a single rotary atomizer or a nozzle for spraying pressurized process fluid is disposed at the center of inlet of hot gas. In a larger capacity spray dryer, rotary atomizers are not employed usually but a plurality of nozzles for spraying pressurized process fluid are disposed toward a single large diameter inlet of hot gas.

When a rotary atomizer or a plurality of nozzles are employed for improving the drying efficiency of drying chamber, a rotating board for generating a spiral gas stream is disposed at the inlet of hot gas, however, the rotating board is not usually equipped for spraying a process fluid with a single nozzle. The pressurized process fluid sprayed into the hot gas stream from rotary atomizers or spraying nozzles is atomized and dried instantly in the drying chamber, and the exhaust gas is withdrawn from a lower portion of the drying chamber to enter a cyclone collector to separate and collect the dried fine particles in the exhaust gas. The collected fine particles are discharged outside of the system via a rotary valve or a double dumper disposed at a conical lower portion of the cyclone. After separating the fine particles with the cyclone, the exhaust gas is sucked via a exhaust gas pipe by an exhaust gas fan and discharged into the atmosphere.

Heretofore, rotary atomizers are employed for small scale cylindrical vertical spray dryers having a vapory water load of not larger than several tens kg/hr, and pressurized spraying nozzles are not employed. By the rotary atomizer, the process fluid supplied on the central portion of a disc rotating at an ultra high speed flows on the surface or through channels toward the periphery of disc and splashes away in fine fluid particles from the disc edge toward the radial direction (horizontal direction) by means of the centrifugal force. Since the drying hot gas is caused to rotate by the rotating disc, the flow down velocity of the particles in the axial direction of cylindrical chamber is small. Thus, the ratio of diameter to height of the cylindrical chamber including the conical bottom portion is around 1:2. Small spray dryers of this scale are basically installed indoor on the ground floor of housing.

In case of a pressurized spraying nozzle or a two kinds fluid spraying nozzle is employed, the process fluid is sprayed downward in the direction of chamber axis and at a speed of several tens m/sec from the spraying nozzles settled at the center of the inlet of hot gas on the ceiling portion of the drying chamber. The height of drying chamber is considered to be several times as high as that of spray dryers employing rotary atomizers because of the necessity for having the retention time in the drying chamber. In order to make the volume of drying chamber to be the same as that of employing rotary atomizers, it is necessary to halve the diameter of drying chamber, however, adhesion of wet particles on the wall of drying chamber prevents reducing the diameter of drying chamber too small to result in a lowered drying capacity per unit volume of drying chamber. Thus, rotary atomizers have being considered heretofore as far more suitable for small scale spray dryers. Without relating to drying capacities, spray dryers having rotary atomizers are required to enhance the drying efficiency within the drying chamber by disposing a rotating board at the inlet of hot gas to cause a rotation of the gas steam in the drying chamber. Though the rotating gas stream may be useful for enlarging effective regions of the drying chamber, the gas inevitably causes a trouble of depositing entrained fine particles on walls around the inlet of hot gas. The deposited particles encountered by the hot gas turn to char in a short period of time. Since the char grows gradually to layers of char and the grown layers dismember occasionally to result in inclusion of the char in the product, which constitutes fundamental deficiency in those spray dryers of difficultly operable for a long period of time.

SUMMARY OF THE INVENTION

It is an object of the present invention to provide a spray dryer of not larger than several tens kg/hr capacity, employing a pressurized spray nozzle for eliminating the abovementioned deficiency of the rotary atomizer-type spray dryer, and having a dryer height comparable to that of conventional small capacity spray dryers employing rotary atomizers and having a far superior evaporating capacity per unit volume.

It is a further object of the present invention to provide a large capacity spray dryer having a low height, a small floor area and a evaporating capacity per unit volume superior to conventional large capacity spray dryers employing pressurized spray nozzles.

A two-stage drying spray dryer according to the present invention is characterized by that the dryer comprises a box type upper body having a rectangular horizontal cross section, a middle body having a pair of side walls inclining inward and approaching mutually along larger side walls of the upper body, a box type bottom body having a rectangular horizontal cross section, a ceiling board disposed on the upper edge of the upper body, a bottom plate disposed on the lower edge of the bottom body, a vertical partition wall for separating the upper body into a larger chamber and a smaller chamber having the same vertical cross section, a pressurized spray nozzle of raw material fluid disposed in an upper portion of the larger chamber of the upper body, a ring-form inlet of hot gas disposed circularly around the pressurized spray nozzle of raw material fluid, an outlet of gas and powder stream disposed in an upper portion of the smaller chamber of the upper body, a gas stream dispersing perforated plate disposed horizontally in a middle portion of the bottom body, a fluidizing gas retaining chamber formed in the bottom body below the gas stream dispersing perforated plate, and a fluidizing gas charging pipe disposed in the fluidizing gas retaining chamber.

DESCRIPTION OF THE PREFERRED EMBODIMENTS

Figure 1:
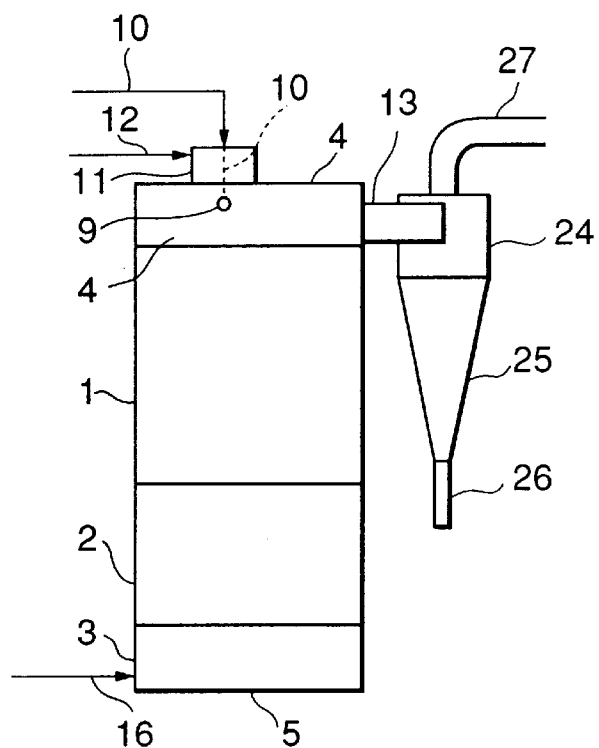
FIG. 1 is a side view of an exemplified present dryer viewed from the larger side.
Figure 2:
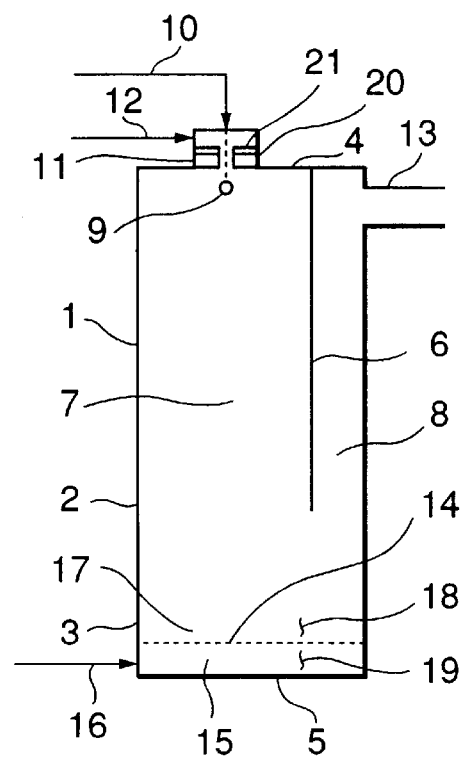
FIG. 2 is a sectional view of the dryer of FIG. 1 viewed from the larger side.
Figure 3:
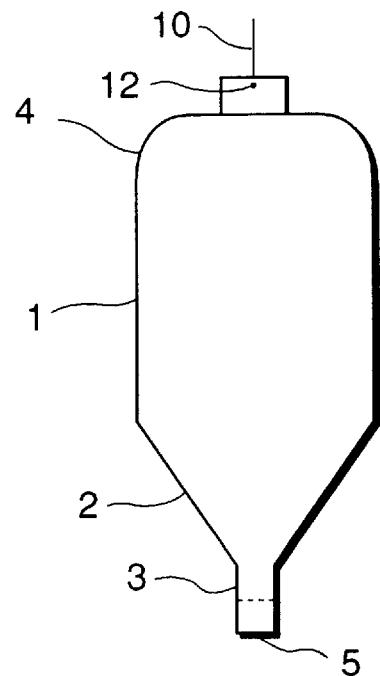
FIG. 3 is a side view of the dryer of FIG. 1 viewed from the smaller side.
Figure 4:
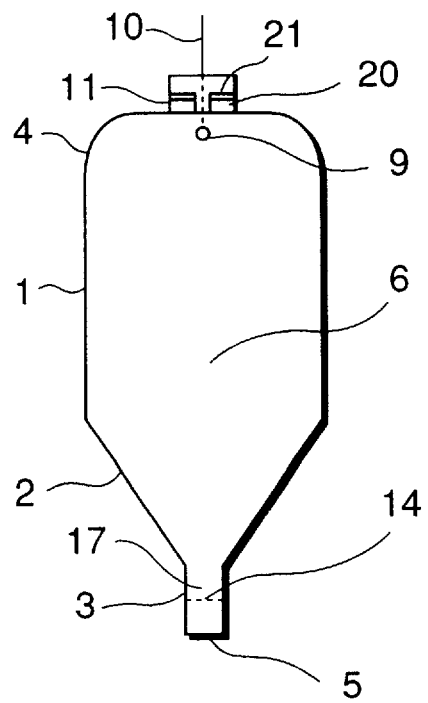
FIG. 4 is a sectional view of the dryer of FIG. 1 viewed from the smaller side.
Figure 5:
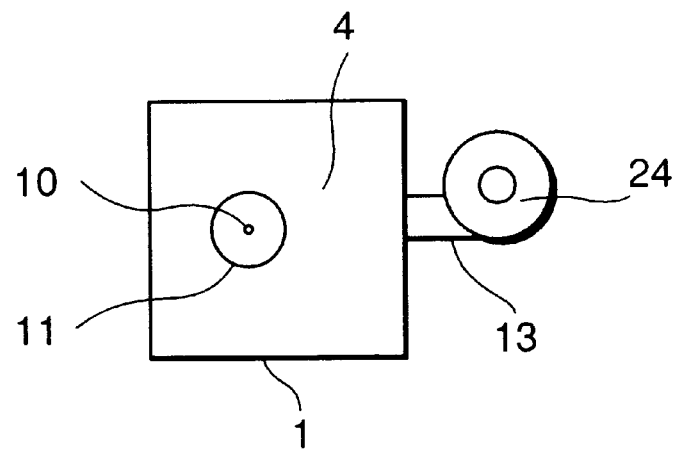
FIG. 5 is a plan of the dryer of FIG. 1 viewed from the above.
Figure 6:
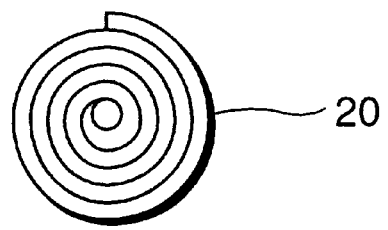
FIG. 6 is a top view of the inlet of hot gas having a spirally wound honeycomb structure suitable for charging of hot gas.
Figure 7:
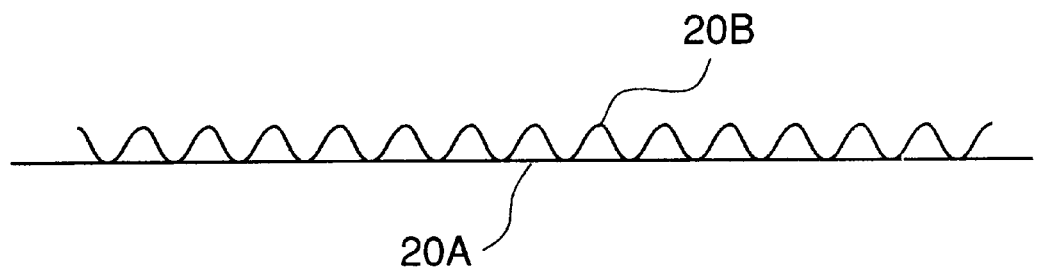
FIG. 7 is an explanative view for preparing the honeycomb structure hot gas inlet of FIG. 6.
Figure 8:
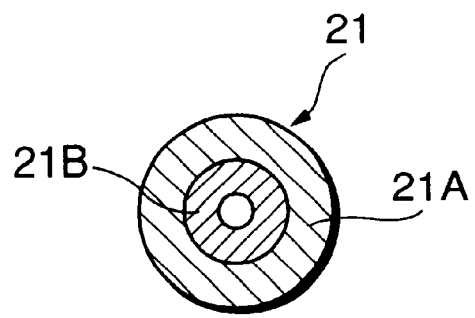
FIG. 8 is a top view of the aperture disc to be disposed on the inlet of hot gas.
Figure 9:
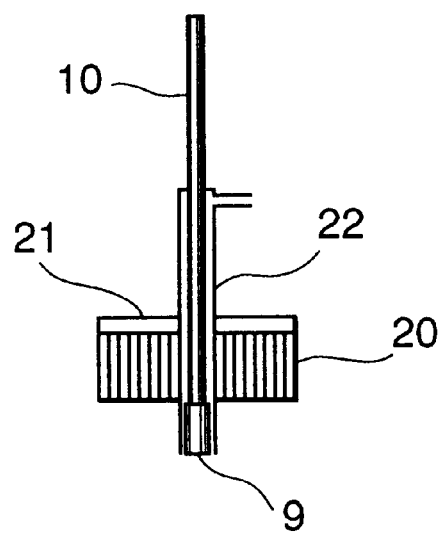
FIG. 9 is a view showing the structure of the end of the raw material fluid charging pipe.
Figure 10:
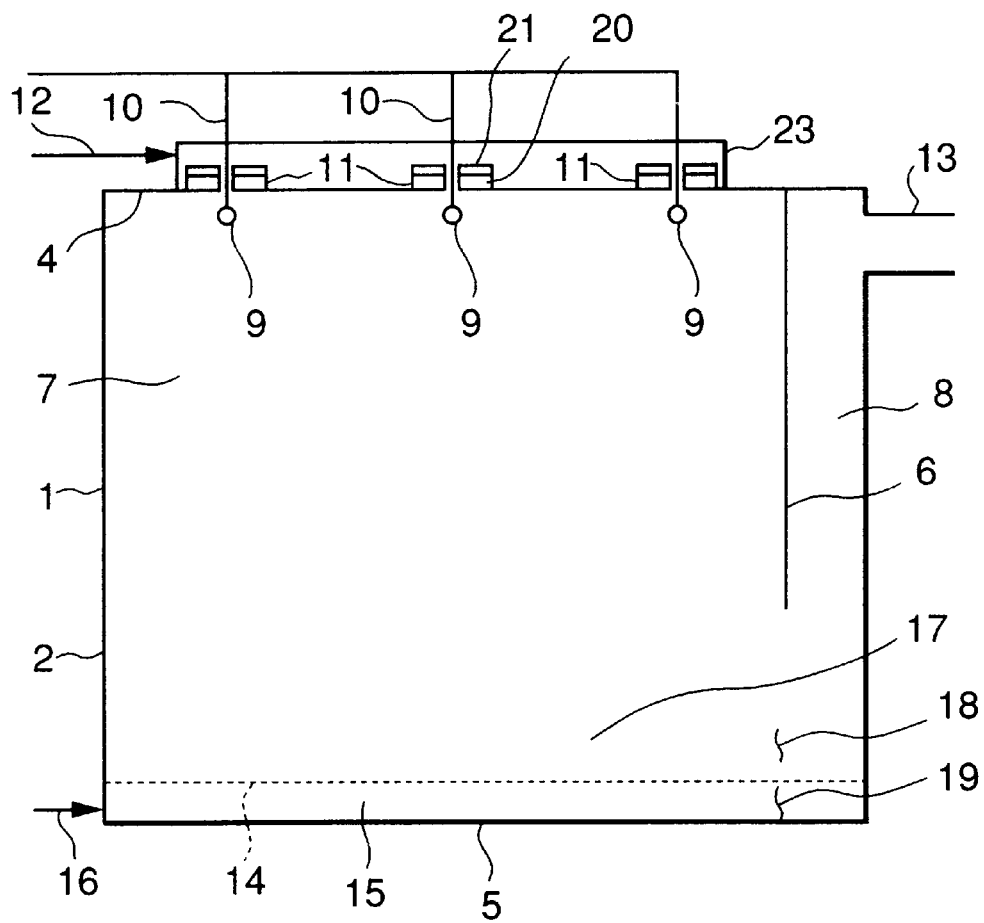
FIG. 10 is a sectional view from the larger side of the spray dryer equipped with a plurality of raw material fluid charging pipes and inlets of hot gas.
Figure 11:
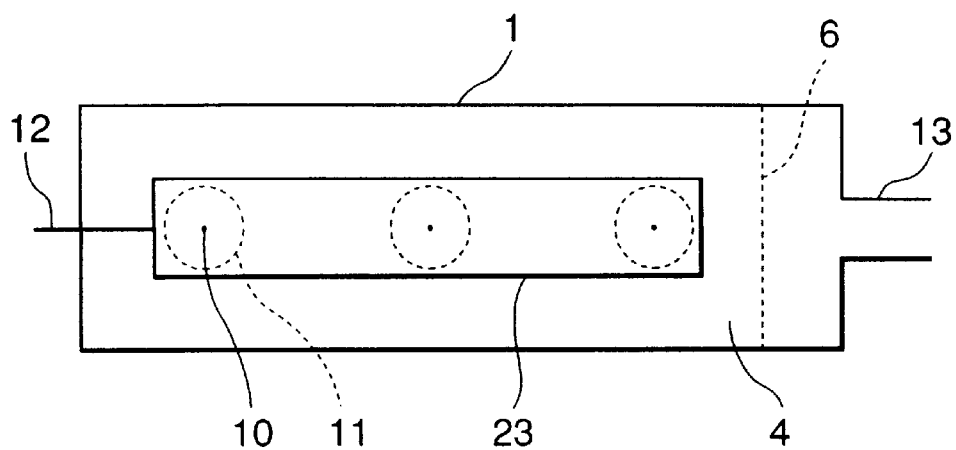
FIG. 11 is a top view of the spray dryer of FIG. 10.
Figure 12:
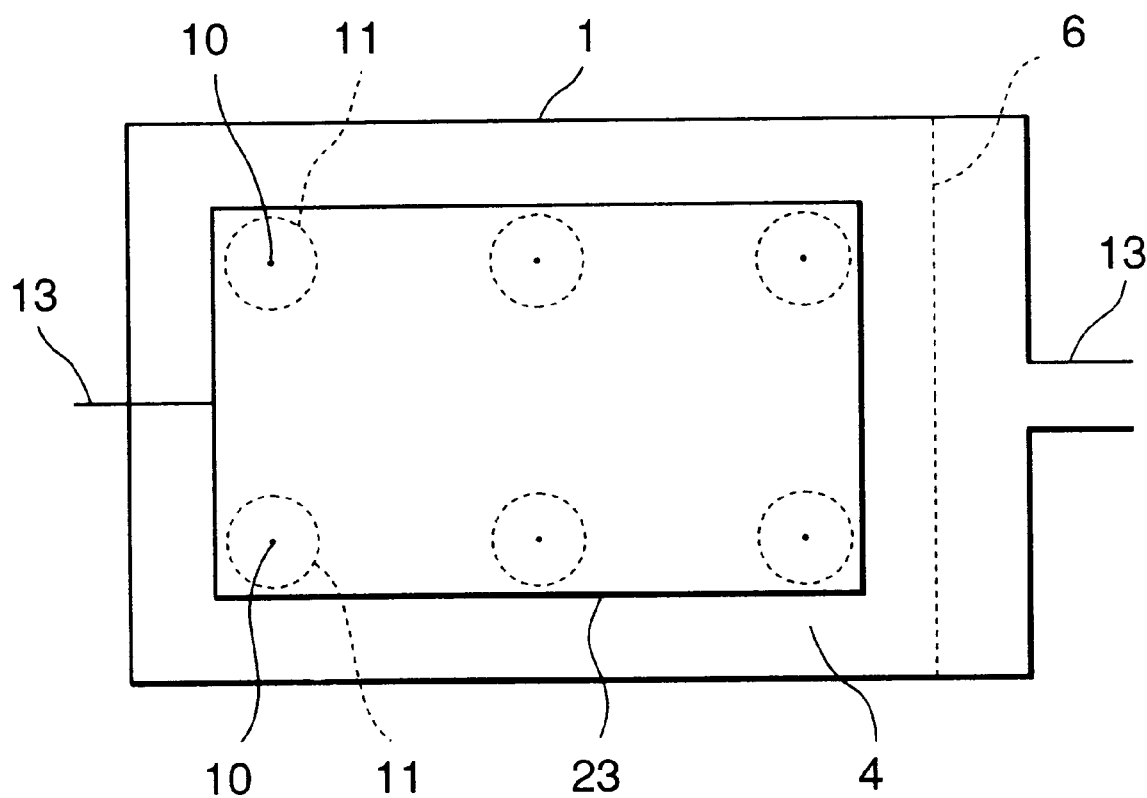
FIG. 12 is a top view of another spray dryer equipped with a plurality of raw material fluid charging pipes and inlets of hot gas.

Fundamental constituents of the present two-sage drying spray dryer will be explained based on the drawings, in which FIG. 1 shows a side view from the direction of the larger side wall, FIG. 2 shows a sectional view from the direction of the larger side wall, FIG. 3 shows a side view from the direction of the smaller side wall, FIG. 4 shows a sectional view from the direction of the smaller side wall and FIG. 5 shows a plan viewed from the above.

The two-stage drying spray dryer according to the present invention is equipped essentially with a box type upper body 1 having a rectangular horizontal cross section, a middle body 2 having a pair of side walls inclining inward and approaching mutually along the larger side walls of the upper body, a box type bottom body 3 having a rectangular horizontal cross section, a ceiling board 4 disposed on the upper edge of the upper body, a bottom plate 5 disposed on the lower edge of the bottom body, a vertical partition wall 6 for separating the upper body into a larger chamber 7 and a smaller chamber 8 having the same vertical cross section, a pressurized spray nozzle of raw material fluid 9 disposed in an upper portion of the larger chamber 7 of the upper body, a ring-form inlet of hot gas 11 disposed circularly around the pressurized spray nozzle of raw material fluid, an outlet of gas and powder stream 13 disposed in an upper portion of side wall of the smaller chamber of the upper body, a gas stream dispersing perforated plate 14 disposed horizontally in a middle portion of the bottom body, a fluidizing gas retaining chamber 15 formed in the bottom body below the gas stream dispersing perforated plate, and a fluidizing gas charging pipe 16 disposed in the fluidizing gas retaining chamber. The larger chamber 7 functions as a spray drying chamber, the smaller chamber 8 functions as a gas discharging chamber, and the bottom body extending above the gas stream dispersing perforated plate 14 functions as a fluidized drying chamber 17. The tilt angle for side walls of the middle body may be larger than the angle of repose of the powder, and is preferably settled at larger than 65° in consideration of various kinds of powder used.

For the two-stage drying spray dryer according to the present invention, it is essential that the spray drying chamber is coupled with the fluidized drying chamber and further the horizontal cross section is rectangular. The two-stage drying spray dryer having the spray drying chamber coupled with the fluidized drying chamber enables a remarkable effect on lowering the height of the equipment, and the rectangular horizontal cross section of the equipment is quite effective for restricting formation of a revolving gas stream in the spray drying chamber as well as for preventing fine particles entrained by the revolving gas stream from adhesion to walls of the drying chamber to be charred by the hot gas.

The working mechanism of the two-stage drying spray dryer will be explained hereunder. The raw material fluid is sprayed downward in high speed from the pressurized spray nozzle 9 into the larger chamber 7 (spray drying chamber), and the hot gas flowing downward from the ring-form inlet of hot gas 11 disposed around the spray nozzle envelopes the sprayed fluid particles to cause evaporation of the water contained. The fluid particles pulverized by the pressurized spray nozzle have usually a normal particle size distribution and the size of particles range from several $\mu$ for fine particles to several times larger than the average particle size for large particles. In drying of these fluid particles different in particle sizes, the retention time necessary for drying them to a specified water content level varies inevitably. During falling down in the larger chamber 7 (spray drying chamber) which is not so tall, the smaller size fluid particles are dried completely to have a low density while the larger size fluid particles cannot be dried completely and remain in a high density. The exhaust hot gas enters the smaller chamber 8 (exhaust gas chamber) through an opening below the lower end of the vertical partition wall 6 and goes upward to be discharged from the outlet of gas and powder stream 13. The dried low density fine particles entrained by the exhaust gas are discharged from the outlet 13 to enter the cyclone 24 to be separated from the exhaust gas. On the other hand, the larger size particles in not fully dried and in a high density fall down directly into the fluidized drying chamber 17 (upper half portion of the bottom body), and the larger size particles entrained by the hot exhaust gas stream flowing toward the smaller chamber 8 (exhaust gas chamber) are separated from the gas stream at the turning point passing through the opening due to the high inertia of terminal velocity to fall down also into the fluidized drying chamber 17. Since the gas stream dispersing perforated plate 14 is disposed horizontally in the middle portion of the lower body 3, and the hot gas stream flows upward from the fluidizing gas retaining chamber 15 disposed below the gas stream dispersing perforated plate, a fluidized drying zone for large size particles in not fully dried and in a high density is formed in the fluidized drying chamber 17 to achieve fluidized drying of the large size particles. Particles dried to have a specified water content and became in a low density go upward together with the exhaust gas along the smaller chamber 8 (exhaust gas chamber) to go out from the outlet of gas and powder stream 13 towards the cyclone 24, and are separated from the exhaust gas.

The gas stream dispersing perforated plate has preferably a several times larger opening ratio in the exhaust gas chamber region than that in the fluidized drying chamber region. The areal velocity of gas through these regions may be controlled by a gas dumper 19 disposed in the fluidizing gas retaining chamber 15 at the site corresponding to the vertical partition wall. The areal gas velocity at the perforated plate in the exhaust gas chamber region is preferably far faster than the gas velocity settled usually for the fluidized drying zone. Larger size particles blown upward in the fluidized drying chamber stall at the wide cross section area region, fall on the inclined walls, slide down the inclined wall by means of vibration with vibrating motors (or knockers) and return to the fluidized drying zone. During repetition of the upward blowing and sliding down, the particles are dried, and the most swift upward gas stream formed in the exhaust gas chamber between the outlet of gas and powder stream 13 and the vertical wall entrains the dried particles to be discharged. According to the practical operation, drying of particles to a specified water content can be achieved at a far lower chamber temperature than that of a single stage spray drying system, by controlling the temperature and areal velocity of the fluidized drying air (secondary air).

The height of fluidizing powder zone in the fluidized drying chamber 17 can be readily adjusted by changing the height of the weir board 18, and the retained powder can be discharged by opening a lower gate of the weir board 18 when the operation is shut down. For drying of powder having inferior fluidity, a perforated plate capable of dispersing obliquely the gas stream or an increased areal gas velocity is adapted so as to shift the stream of falling powder towards the exhaust chamber to be operable with little retained powder.

As described previously, the fine particles entrained by the revolving stream in the spray drying chamber tend to adhere to the ceiling portion around the inlet of hot gas, and the adherent is charred by the hot gas in a short period of time to result inevitably troubles of char inclusion in the product. For restricting the formation of the revolving gas stream, it is effective not only the horizontal cross section of spray drying chamber (larger chamber) being rectangular but also the ring-form inlet of hot gas 11 being a spiral or a concentric multi-circular honeycomb structure 20 as shown by FIG. 6. The hot gas enters through clearances of the honeycomb structure to flow laminar. FIG. 7 explains a method of preparing the honeycomb structure inlet of hot gas shown by FIG. 6, for which a stainless sheet 20A and a corrugated sheet 20B are overlaid and wound to obtain the spiral honeycomb structure 20. Preferably, an aperture disc shown by FIG. 8 is disposed on the honeycomb inlet 20, in which the opening ratio at the periphery 21A of the disc is smaller than that of the central portion 21B. By means of the aperture disc, the amount of entering hot gas becomes larger around the central portion and smaller at portions away from the center, and the hot gas around the central portion effectuates the drying and that of at periphery portions acts as an air curtain restricting dried fine particles spread toward the wall and adhere thereto.

In the present dryer, since the raw material fluid charging pipe 10 having the pressurized spray nozzle of raw material fluid 9 is surrounded by hot gas at its inserted portion, components of the raw material fluid sometimes decompose due to the excessive heating. In case the decomposition is worried, a cooling double pipe 22 may be disposed as shown by FIG. 9 to cover the raw material fluid charging pipe 10 and cold outdoor air may be passed therein. By the pipe cooler, excessive heating of the raw material fluid passing through the charging pipe 10 and the spraying nozzle 9 can be prevented from overheating even when the hot gas is hotter than 300° C.

The amount of raw material fluid to be processed with one spraying nozzle is restricted by the height of the dryer (height of spray drying chamber), and so in order to enlarge processing capacity (evaporating capacity) without increasing the height of dryer, it is necessary to increase the cross-sectional area of dryer and dispose a plurality pairs of the raw material fluid spraying nozzles and inlets of hot gas. Several pairs of spraying nozzles and inlets of hot gas may be arranged longitudinally in one raw as shown for the side view in FIG. 10 and in FIG. 11 for the plan. However, 6–12 pairs may be arranged evenly in two raws as shown for the plan in FIG. 12, because the hot gas flows faster in the longitudinal direction for the pairs of too large numbers to make drying conditions for the first pair and for the last pair differ recognizably. In any case, each pair of the spray nozzle and inlet of hot gas is arranged with an equal distance to occupy a square area in the spray drying chamber in order to avoid mutual interference. Further, the hot gas charging pipe is not necessarily disposed for each outlet of hot gas but a hot gas charging pipe 12 is connected to a box-type hot gas charging chamber 23 covering the entire inlets of hot gas.

Under ordinary conditions, a conventional cylindrical chamber-type spray dryer having such a large water evaporating capacity as 10,000 kg/hr is as high as over 20 m. In the present dryer, since the water evaporating capacity of around 1,000 kg/h per spray nozzle is feasible by use a 10 m height dryer, 12 pairs of the spray nozzles and inlets of hot gas may achieve evaporation capacity of 12,000 kg/hr to comply with almost all requirements.

The ceiling board 4 connected to the larger side of walls of the upper body 1 preferably have a curved shape of shell type as shown by FIGS. 3 and 4, though the shape has no direct relation to drying capacity of the dryer. The fabrication may be troublesome, however, the structure is aimed at shortening a lot of time required for drying of water remained adhesively on the surface of ceiling after the chamber is washed. Further, the curved shape ceiling has larger stiffness than a plane ceiling and is hardly deformed without reinforcements.

Though such specialty products as skim milk, dextrin, detergents and drugs are to be treated by respectively specialized spray dryers, a large number of spray dryers are requested to engage in drying a variety of material. Especially, small capacity dryers have to handle several kinds of material within a day. Thus, it is quite important for evaluating a dryer from stand points not only of the drying capacity but also of the easiness and length of time for washing and drying required whenever the handling material is altered. The present two-stage drying spray dryer is small in the surface contacting with powder and the inner structure is washable easily, and is preferably equipped with such washing fluid nozzles as slow-rotating wash balls on ceiling portions of the drying chamber and the exhaust gas chamber as well as washing fluid showering nozzles on ceiling portions of the cyclone, by which automatic washing of the dryer becomes feasible. Numbers of washing fluid nozzles are so disposed at appropriate sites as not to leave dead points in compliance with the size and shape of washing space. By disposing these washing fluid nozzles and connecting them to warm water supplying pipes, washing fluid tanks and discharging pipes of pump, an automatic washing of the equipment can be accomplished in a short time without necessitating manual processing of the washing, and drying of the equipment by hot air can be achieved swiftly due to the shape retaining no water nor fluid inside of the equipment.

Conventional spray dryers having parallel-flow type cylindrical chambers discharge the waste gas and dried powder stream from an outlet disposed at a bottom portion (around the ground level) of the dryer. Thus, a lengthy piping for conveying the gas and powder stream to a cyclone disposed highly above the ground level is required, and washing or drying of the piping imposes hard works. On the contrary in the two-stage drying spray dryer of the present invention, since the outlet of waste gas and dried powder stream is disposed at an upper side wall of the smaller chamber of the upper body, the outlet is connected directly to the cyclone as indicated in FIG. 1. Thus, no need for piping connecting the spray dryer with the cyclone not only reduces the cost and space for the piping but also eliminates the washing and drying problems.

The powder separated by the cyclone is cooled optionally to a predetermined temperature by pneumatic transportation with dehumidified cold air or by a fluidized cooling bed. Exhaust gas from the cyclone is passed to a bag filter to collect fine particles, if necessary.

EXAMPLE 1

A two-stage drying spray dryer having the structure indicated by FIGS. 1–5 and the dimension mentioned below is exemplified.

Upper body: width 1100 mm×length 1400 mm×height 1800 mm

Middle body: height 1000 mm
- width and length of upper edge are the same to those of upper body
- width and length of lower edge are the same to those of lower body Lower body: width 100 mm×length 1400 mm×height 550 mm Vertical partition wall: located at 300 mm from edge Upper portion of larger chamber: width 1100 mm×length 1100 mm×height 1800 mm Vertical body portion (spray drying chamber): volume 2.18 $m^3$ Middle portion of larger chamber: height 1000 mm Inclined wall portion (fluidized drying chamber): volume 0.66 $m^3$ Total volume of drying chamber: 2.84 $m^3$ Temperature of spray drying hot gas: max.250° C.

Amount of spray drying hot gas: max.15 $m^3$/min

Temperature of fluidized drying hot gas: max.150° C.

Amount of fluidized drying hot gas: max.3.5 $m^3$/min

Amount of water vaporized (220° C.→90° C.): 40 kg/hr

Amount of water vaporized per unit volume: 40÷2.84=14.1 kg/hr

Comparative Example 1

A rotary atomizer-equipped spray dryer having almost the same size with that of the two-stage spray drying dryer of Example 1 is exemplified.

Drying chamber (cylindrical): ϕ1600 mm

Total volume of drying chamber: 2.76 $m^3$

Temperature of spray drying hot gas: max.170° C.

Amount of spray drying hot gas: max.8 $m^3$/min

Amount of water vaporized (170° C.→100°C.): 10 kg/hr

Amount of water vaporized per unit volume: 10÷2.76=3.6 kg/hr

As explained in detail, a far superior evaporation capacity per volume is achieved than a rotary atomizer-equipped conventional spray dryer of almost the same size, even by use of a pressurized spray nozzle and under conditions of as small capacity of as several tens kg/hr, and at most 27% larger capacity is allowed for the present dryer than conventional spray dryers because of having a rectangular cross sectional shape. Even a difficultly suited space for cylindrical dryers is employable for the present dryer because of the changeable aspect ratios of the rectangular cross section.

What is claimed is:

1. A two-stage drying spray dryer comprising a box type upper body having a rectangular horizontal cross section, a middle body having a pair of side walls inclining inward and approaching mutually along larger side walls of the upper body, a box type bottom body having a rectangular horizontal cross section, a ceiling board disposed on the upper edge of the upper body, a bottom plate disposed on the lower edge of the bottom body, a vertical partition wall for separating the upper body into a larger chamber and a smaller chamber having the same vertical cross section, a pressurized spray nozzle of raw material fluid disposed in an upper portion of the larger chamber of the upper body, a ring-form inlet of hot gas disposed circularly around the pressurized spray nozzle of raw material fluid, an outlet of gas and powder stream disposed in an upper portion of the smaller chamber of the upper body, a gas stream dispersing perforated plate disposed horizontally in a middle portion of the bottom body, a fluidizing gas retaining chamber formed in the bottom body below the gas stream dispersing perforated plate, and a fluidizing gas charging pipe disposed in the fluidizing gas retaining chamber.

2. The two-stage drying spray dryer according to claim 1, wherein the ring-form inlet of hot gas has a honeycomb structure having a spiral form or a concentric multi-circular form.

3. The two-stage drying spray dryer according to claim 2, wherein the ring-form inlet of hot gas has on the honeycomb structure a disk-form aperture plate having a smaller opening ratio in the periphery portion than in the central portion.

4. The two-stage drying spray dryer according to claim 1, wherein a plurality sets of the pressurized spray nozzle of raw material fluid and the inlet of hot gas are disposed.

5. The two-stage drying spray dryer according to claim 1, wherein the ceiling board has a curved structure at the connecting portion with the larger side walls of the upper body.

6. The two-stage drying spray dryer according to claim 1, wherein the outlet of gas and powder stream is connected directly with a cyclone.

7. The two-stage drying spray dryer according to claim 1, wherein a washing fluid nozzle is disposed in the ceiling board.

* * * * *